O. Clarke,
Cider Press.
Nº 42,528. Patented Apr. 26, 1864.
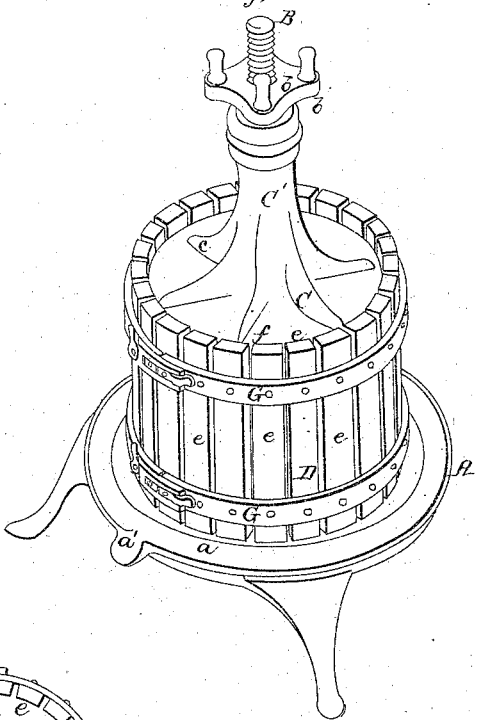
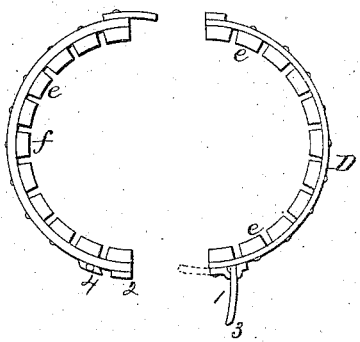
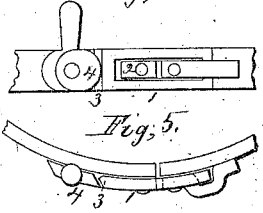
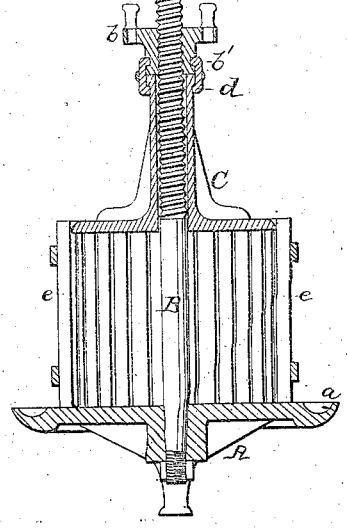
Witnesses;
J. Snowden Bell
Fr. Schmidt
Inventor,
Orlando Clarke
by his Attorneys
Baldwin & Son

UNITED STATES PATENT OFFICE.

ORLANDO CLARKE, OF ROCKFORD, ILLINOIS, ASSIGNOR TO HIMSELF AND ISAAC UTTER, OF SAME PLACE.

CIDER-PRESS.

Specification forming part of Letters Patent No. 42,528, dated April 26, 1864.

*To all whom it may concern:*

Be it known that I, ORLANDO CLARKE, of Rockford, in the county of Winnebago and State of Illinois, have invented a new and useful Improvement in Cider-Presses, of which the following is a full, clear, and exact description, reference being had to the accompanying drawings, which make part of this specification, and in which—

Figure 1 represents a view in perspective of a press embracing my improvements. Fig. 2 represents a vertical central section through the same. Fig. 3 represents a view of the curb or hoop which incloses the articles to be pressed detached, and Figs. 4 and 5 represent views of the fastenings by which the sections of the curb are united to hold the pomace when under pressure.

It is the object of my invention to express the juice of fruits thoroughly in a press that shall combine both economy of construction and of space, be strong enough to expel all the moisture from the fruit, and at the same time be light and portable and permit the removal of the pulp with ease, to which ends my improvement consists in making the curb or hoop in which the fruit is pressed in sections, to permit its removal to facilitate access to the pomace after the juice has been expressed therefrom, and fastening and releasing the sections by an eccentric, arranged as hereinafter described.

To enable others skilled in the art to make and use my invention, I will now proceed to describe the construction and operation of my improved press with reference to the accompanying drawings.

To a bed-plate, A, of suitable strength (having a trough, $a$, around its edge, with a spout, $a'$, to conduct the expressed juice into any proper receptacle) I attach securely a strong screw, B. This plate may be made of any suitable material, and the screw, which should be of some proper metal, may be fastened rigidly to its center or allowed a slight play, to facilitate the adaptation of the surface of the follower to that of the pomace within the curb.

On the central screw, B, I fit a nut or annular collar, $b$, that works truly on the thread of the screw, and the screw need only be threaded down to the top of the curb. The collar $b$ is attached by an annular box or ring, $b'$, to the follower C, which may be strengthened by means of a long neck or hub, $C'$, descending from the collar $b$ to the outer edge of the platen, and having radial braces or flanges $c$ to strengthen it, which should be somewhat smaller than the curb, to move freely and vertically within it. The collar or nut $b$ may have a wheel, bars, or arms for rotating it on the screw, and the top of the platen should permit the collar $b'$ to turn freely in its groove or lip $d$, so that the platen may move up and down on the screw without turning.

I make the curb or hoop D of the press in two or more sections, consisting of staves $e$, securely fastened to two or more sectional hoops, G G, and leave spaces $f$ between the staves sufficient to permit the free escape of all the expressed juice into the trough $a$.

On one end of each of the sections of the hoops I form an ordinary loop-catch (or I can use a hasp and staple of the common form) to bring the ends of the sections together on one side and hold them firmly united, and when more than two sections are used to form the curb all the parts but the closing one may be thus secured. When the hoop is completed, I close a slotted latch, 1, on a boss or pin, 2, the latch being hinged to one end of the section and the boss or pin being secured to the adjacent end of the corresponding section. The end 3 of the latch is chamfered or beveled on both faces, that it may be securely locked in position by a beveled eccentric or latch-lever, 4, which, when turned into the position shown in Figs. 4 and 5, holds the entire hoop firmly together, but when turned the other way, to release the hasp, the bevel of the eccentric passes under the latch 3 and forces it off the staple. It is obvious that these staves, hoops, and fastenings must be made of strength sufficient to sustain all the pressure required to express the juice from the fruit.

When one charge of fruit or pomace has been pressed, the follower may be raised from contact with it, the eccentric 4 turned out of contact with the catch, and the catch 1 released, when the curb will open in sections and can easily be removed to permit free access to the pomace on all sides, and thus greatly diminish the labor of removing it from the press.

When desirable to prevent leakage or the contact of the apples, grapes, or other articles being pressed with the common metal screw, a central sleeve of some non-corrosive metal may be secured upon the base or bed of the press and inclose the screw to the height of the curb, in which case the central opening in the platen and its collar must be large enough to pass freely over the sleeve.

What I claim as my invention, and desire to secure by Letters Patent, is—

The sectional curb or hoop D, when fastened and released by the eccentric, and constructed, arranged, and operating substantially in the manner and for the purpose described.

In testimony whereof I have hereunto subscribed my name.

ORLANDO CLARKE.

Witnesses:
 M. L. UTTER,
 S. A. GRANGER.